(12) United States Patent
Easthouse

(10) Patent No.: US 8,222,522 B1
(45) Date of Patent: Jul. 17, 2012

(54) VAPOR-PROOF ELECTRICAL FACE PLATE

(76) Inventor: Robbie J. Easthouse, Rochester, MN (US)

(*) Notice: Subject to any disclaimer, the term of this patent is extended or adjusted under 35 U.S.C. 154(b) by 309 days.

(21) Appl. No.: 12/573,906

(22) Filed: Oct. 6, 2009

(51) Int. Cl.
*H02G 3/14* (2006.01)
*H05K 5/03* (2006.01)

(52) U.S. Cl. ............ 174/66; 174/67; 220/241; 220/242

(58) Field of Classification Search .................... 174/66, 174/67, 50, 53, 480, 481, 17 CT; 220/3.2, 220/3.3, 3.8, 241, 242; D13/156, 177; 439/536
See application file for complete search history.

(56) References Cited

U.S. PATENT DOCUMENTS

| | | | | |
|---|---|---|---|---|
| 1,713,101 A * | 5/1929 | Starrett | ........................... | 174/66 |
| 4,163,137 A * | 7/1979 | Close, Jr. | ........................ | 174/66 |
| 4,293,173 A * | 10/1981 | Tricca | ............................. | 174/67 |
| 4,484,021 A * | 11/1984 | Schaefer et al. | ................ | 174/67 |
| 5,837,937 A * | 11/1998 | Reese et al. | ..................... | 174/66 |
| 6,521,834 B1 * | 2/2003 | Dykhoff et al. | ................. | 174/66 |
| 7,674,977 B1 * | 3/2010 | Constantino | ................... | 174/67 |
| 7,709,735 B2 * | 5/2010 | Vigorito et al. | ................ | 174/67 |

* cited by examiner

*Primary Examiner* — Angel R Estrada
(74) *Attorney, Agent, or Firm* — Montgomery Patent & Design, LLC; Robert C. Montgomery; Joseph T. Yaksich

(57) ABSTRACT

An integral vapor barrier for use on electrical boxes located in external walls of structures is herein disclosed. The vapor barrier is applied to, or forming an integral part thereof, an interior surface of an electrical cover plate and particularly useful for exterior electrical boxes prior to installation. The vapor barrier extends outwardly therefrom the exterior periphery of the electrical cover plate at a distance to ensure a total barrier. It can be used on new construction as well as remodeling work. When in place, it greatly reduces heat loss or gain through electrical boxes and stops drafts around said boxes. It can be used in any wall or ceiling that is typically insulated. It can even be used on inside walls to help with noise control and abatement as well.

11 Claims, 4 Drawing Sheets

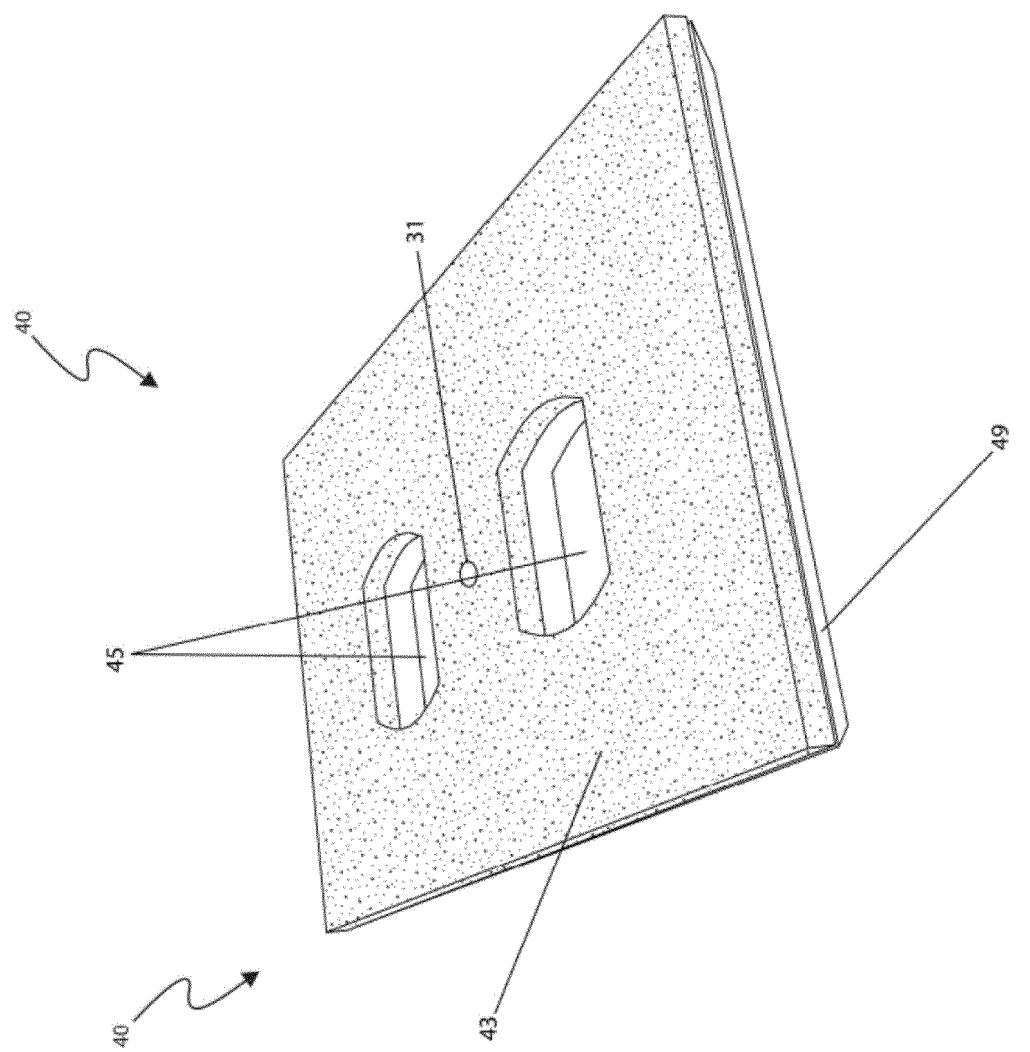

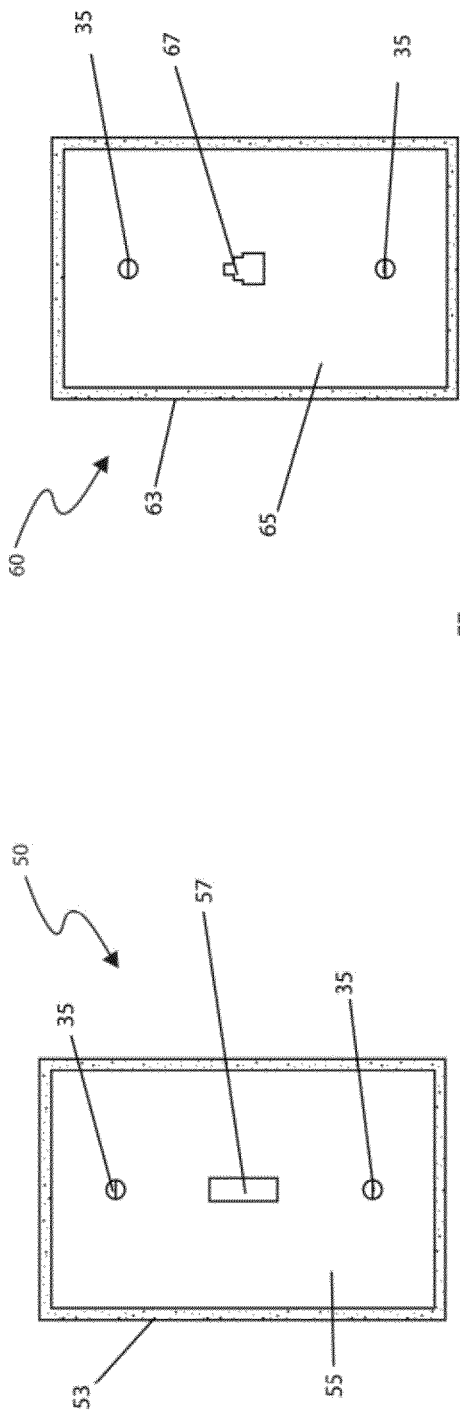
Fig. 3a
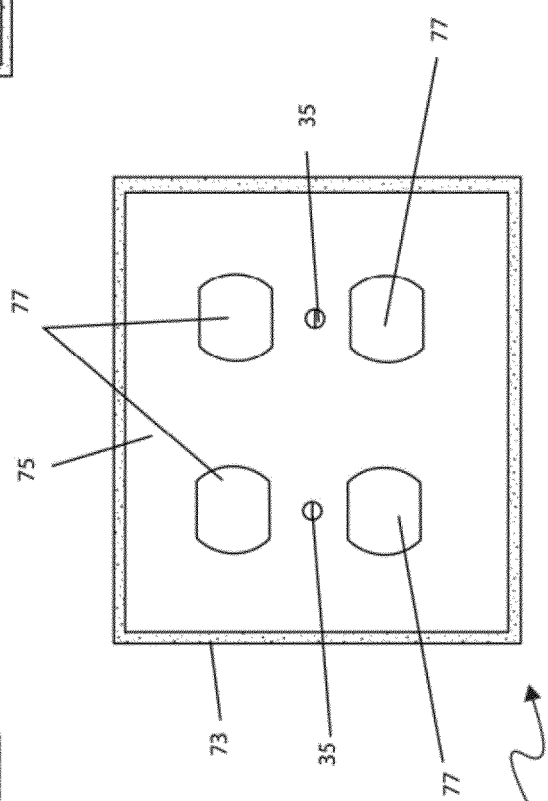
Fig. 3b
Fig. 3c

VAPOR-PROOF ELECTRICAL FACE PLATE

RELATED APPLICATIONS

The present invention was first described in a notarized Official Record of Invention on Jan. 18, 2008, that is on file at the offices of Montgomery Patent and Design, LLC, the entire disclosures of which are incorporated herein by reference.

FIELD OF THE INVENTION

The present invention relates generally to electrical receptacles, and more particularly, to an electrical receptacle cover plate with an integral vapor barrier for use on electrical boxes located in external walls of a structure.

BACKGROUND OF THE INVENTION

With our heightened awareness of the importance of energy consumption, it is becoming increasingly important to take steps in conserving energy, planning for our future and saving money. One (1) of the methods that many people use to meet these goals is to optimize the thermal insulation in their homes. Typically, the exterior walls and the attic or crawl spaces of homes are shielded from the outside temperature gradients by the use of an insulating material. Other insulating materials are typically used around doors and windows. However, a great deal of heat loss or gain actually occurs around electrical boxes such as those used for outlets, switches and light fixtures. Due to their thickness, it is often impossible to insulate around them, thus making them available to lose or gain heat. Additionally, the lack of a vapor barrier also means that water can condense on the inside or outside of the receptacle box.

Various solutions have been attempted to overcome the inherent disadvantages of traditional electrical fixture covers. These attempts include applying caulking to the faceplate seams or the use of gaskets which may prevent air passage. These solutions are undesirable since they limit the removal of the face plate or require alteration prior to use. Furthermore, these solutions do not provide sufficient combined thermal and vapor resistance properties, resiliency, or durability and do not provide a pattern which can be used with multiple situations.

Examples of these solutions can be seen by reference to several U.S. patents, including: U.S. Pat. No. 4,293,173, issued in the name of Tricca, which describes a thermal insulating system for electrical outlets on the outside of buildings; U.S. Pat. No. 4,772,767, issued in the name of Sawada, which describes a waterproof casing for an electrical switch; and U.S. Pat. No. 4,163,137, issued in the name of Close, Jr., which describes a gasket for sealing around a wall opening to prevent the passage of air.

Additionally, ornamental designs for wall plates and the like exist as seen by example in U.S. Pat. No. D 505,060, issued in the name of Nortier et al. However, none of these designs are similar to the present invention.

While these devices fulfill their respective, particular objectives, each of these references suffer from one (1) or more of the aforementioned disadvantages. Accordingly, there is a need for a means by which electrical boxes can be provided insulation and vapor protection to address the concerns as listed above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to effectively insulate electrical receptacle boxes and thus, the object of the present invention is to solve the aforementioned disadvantages and provide for this need.

Another object of the present invention is to provide a vapor-proof electrical faceplate which can be used on electrical boxes on an exterior or interior wall or ceiling that protects electrical outlets, switch fixtures or similar junction.

To achieve the above objectives, the present invention provides a device which provides a means for producing a tight seal between a wall and an electrical faceplate, thereby reducing air, heat, and moisture leakage from AC electrical receptacles and electrical boxes in residential and commercial buildings.

The vapor-proof electrical faceplate for reducing air, heat, and moisture leakage from an electrical receptacle and an electrical box generally comprises a gasket adapted to cover an entire surface area of the electrical box and a faceplate which is adhesively attached to an anterior face of the gasket. The faceplate has an outer perimeter spaced inwardly from an outer perimeter of the gasket and a fastener that is inserted through the gasket and the faceplate, such that the fattener is adapted to be securely mated to the electrical box. The gasket is designed to remain mated to the faceplate during operating conditions such that the outer perimeter of the gasket is adapted to maintain continuous contact between the wall and the electrical faceplate.

Yet still another object of the present invention is to provide a method of utilizing the device that addresses the issue of temperature control around electrical boxes no matter their size or location.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a perspective view of the a single duplex embodiment 40, according to a preferred embodiment of the present invention;

DESCRIPTIVE KEY

Figure 1:
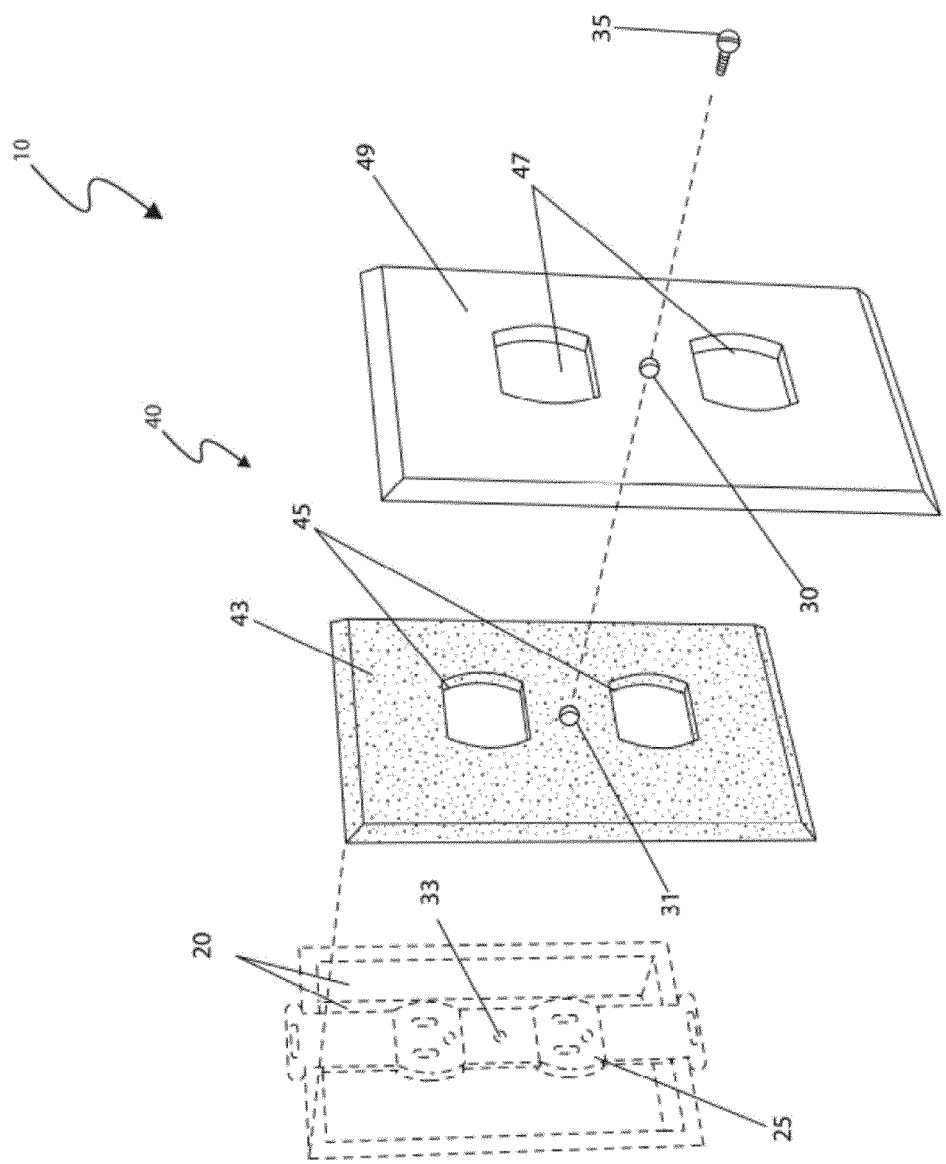
FIG. 1 is an exploded view of a vapor-proof electrical faceplate 10 depicting a single duplex embodiment 40, according to a preferred embodiment of the present invention.

| | |
|---|---|
| 10 | vapor-proof electrical faceplate |
| 20 | electrical box |
| 25 | electrical receptacle |
| 30 | first aperture |
| 31 | second aperture |
| 33 | third aperture |
| 35 | fastener |
| 40 | single duplex embodiment |
| 43 | single duplex gasket |
| 45 | gasket outlet opening |
| 47 | single duplex opening |
| 49 | single duplex faceplate |
| 50 | single switch embodiment |
| 53 | single switch gasket |
| 55 | single switch faceplate |
| 57 | single switch opening |
| 60 | communication port embodiment |
| 63 | communication port gasket |
| 65 | communication port faceplate |
| 67 | communication port opening |
| 70 | double duplex embodiment |
| 73 | double duplex gasket |
| 75 | double duplex faceplate |
| 77 | double duplex opening |
| 80 | dual switch embodiment |
| 83 | dual switch gasket |
| 85 | dual switch faceplate |
| 87 | dual switch opening |
| 90 | switch/duplex embodiment |
| 93 | switch/duplex gasket |
| 95 | switch/duplex faceplate |
| 97 | switch/duplex opening |

DETAILED DESCRIPTION OF THE PREFERRED EMBODIMENT

The best mode for carrying out the invention is presented in terms of its preferred embodiment, herein depicted within FIGS. 1 through 3e. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a vapor-proof electrical faceplate (herein described as the "device") 10, which provides a means for producing a tight seal between a wall and an electrical faceplate, thereby reducing air, heat, and moisture leakage from AC electrical receptacles 25 and electrical boxes 20 therein residential and commercial buildings. The device 10 preferably comprises a gasket 43, a faceplate 49 and a fastener 35. The device 10 is envisioned to be available in a variety of colors and receptacle types such as, but not limited to: outlets, switches, communication ports, or the like. The device 10 is envisioned to be an upgrade and/or replacement thereto common household electrical covers and is utilized in conjunction therewith an existing electrical receptacle 25 housed therewithin an existing electrical box 20.

Referring now to FIG. 1, an exploded view of a single duplex embodiment 40 and FIG. 2 a perspective view of the single duplex embodiment 40, according to the preferred embodiment of the present invention, are disclosed. The device 10 is shown here depicting a preferred single duplex embodiment 40. The device 10 comprises a single duplex gasket 43, a single duplex faceplate 49, and a fastener 35. The single duplex gasket 43 is portrayed therein FIG. 1 as being detached therefrom the single duplex faceplate 49 for illustration purposes only. It is acknowledged that the single duplex gasket 43 is an integral portion thereof the single duplex faceplate 49 and is adhesively bonded together in a manufacturing process as shown in FIG. 2.

The single duplex faceplate 49 comprises a pair of single duplex openings 47, thereby providing a user with an enhanced functionality and access thereto the electrical receptacles 25. The single duplex faceplate 49 also comprises a first aperture 30, thereby providing the device 10 with an attachment means thereto the existing electrical receptacle 25. Said attachment means is accomplished thereby inserting a common threaded fastener thereinto the first aperture 30. The fastener 35 is envisioned to be a hardware device such as, but not limited to: slotted, crosshead, or the like. The dimensions of the single duplex faceplate 49 measure approximately two-and-a-half (2½) inches wide by four (4) inches high. The single duplex faceplate 49 is preferably fabricated from materials such as, but not limited to: metal, plastic, or the like.

The single duplex gasket 43 is adhered thereto a rear portion of the single duplex faceplate 49. The single duplex gasket 43 comprises a pair of gasket outlet openings 45 and second aperture 31 which mimic the single duplex openings 47 and first aperture, respectively. The dimensions of the single duplex gasket 43 measure approximately two-and-a-half (2½) inches wide by one-eighth (⅛) of an inch thick. The single duplex gasket 43 is preferably fabricated from a flame retardant material such as, but not limited to: foam, rubber, or the like.

Figure 3E:
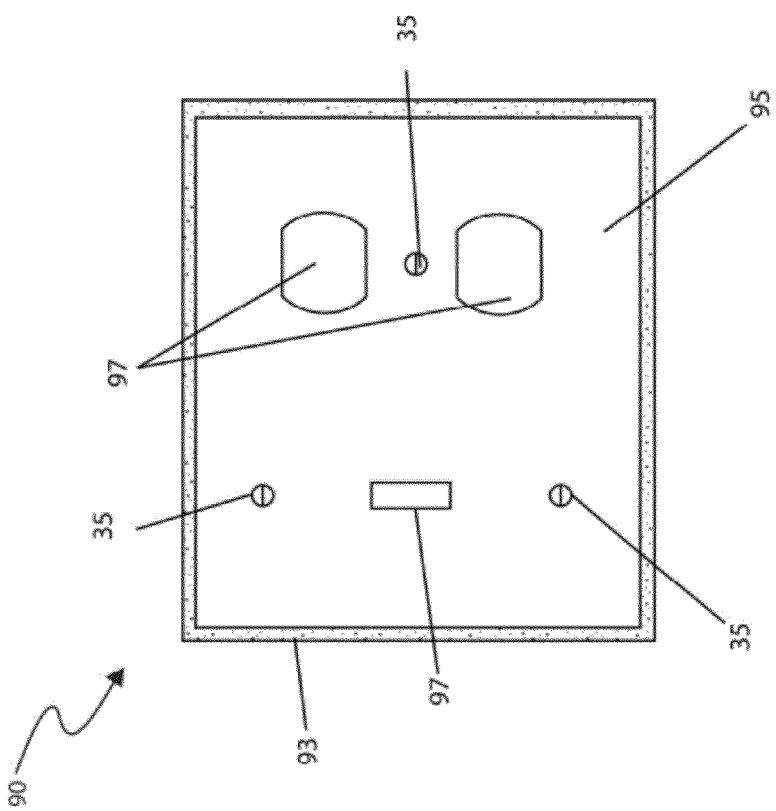
FIG. 3a is a front view of a single switch embodiment 50, according to an alternate embodiment of the present invention.
FIG. 3b is a front view of a communication port embodiment 60, according to another alternate embodiment of the present invention.
FIG. 3c is a front view of a double duplex embodiment 70, according to yet another alternate embodiment of the present invention.
FIG. 3d is a front view of a dual switch embodiment 80, according to yet another alternate embodiment of the present invention; and, FIG. 3e is a front view of a switch/duplex embodiment 90, according to still yet another alternate embodiment of the present invention.
Figure 3D:
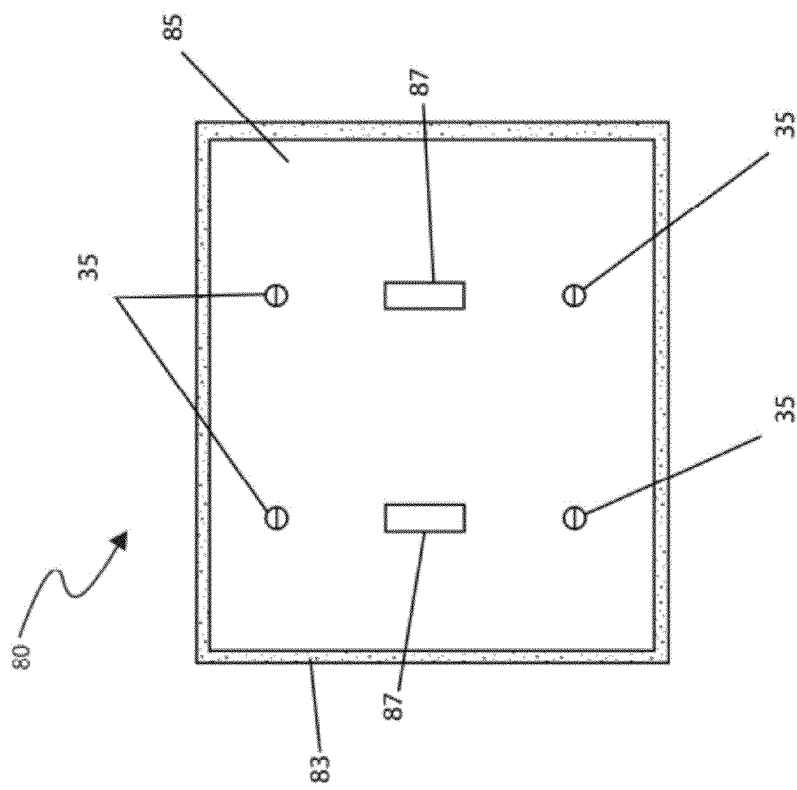

Referring now to FIG. 3d through 3e front views of alternate embodiments of the present invention are herein disclosed. It is envisioned for the device 10 to be available in a variety of forms, thereby allowing the user to vapor-proof multiple types of outlets. Each embodiment 50, 60, 70, 80, 90 comprises an integral gasket 53, 63, 73, 83, 93, a faceplate 49, 55, 65, 75, 85, 95, opening 57, 67, 77, 87, 97, and a set of fasteners 35. Although several embodiments of the device 10 are depicted herein it is understood that a person skilled in the arts may incorporate other types of the present invention thereto suit their requirements. FIG. 3a depicts a single switch embodiment 50, FIG. 3b depicts a communication port embodiment 60, FIG. 3c depicts a double duplex embodiment 70, FIG. 3d depicts a dual switch embodiment 80, and FIG. 3e depicts a switch/duplex embodiment 90, respectively.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of utilizing the device 10 may be achieved by performing the following steps: acquiring the device 10; switching off the main power that runs to the receptacle 25 that is to be worked on; removing existing fasteners 35 therefrom an existing electrical faceplate revealing the electrical receptacle 25; placing the device 10 thereupon the electrical receptacle 25; placing the fastener 35 therethrough the apertures 30, 31, 33 and screwing the device 10 thereinto the electrical receptacle 25; thereby sealing out air, heat, and moisture therewith the device 10; and, repeating the process for other electrical receptacles 25 types therewith alternate embodiments, such as a single switch embodiment 50, a communication port embodiment 60, a double duplex embodiment 70, a dual switch embodiment 80, and a switch/duplex embodiment 90.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A vapor-proof electrical faceplate for reducing air, heat, and moisture leakage from an electrical receptacle and an electrical box, said vapor-proof electrical faceplate comprising: a gasket adapted to cover an entire surface area of the electrical box; faceplate adhesively attached to an anterior face of said gasket, said faceplate having an outer perimeter spaced inwardly from an outer perimeter of said gasket; and, a fastener removably penetrated through said gasket and said faceplate such that said fattener is adapted to be securely mated to the electrical box; wherein said gasket remains statically mated to said faceplate during operating conditions such that said gasket outer perimeter is adapted to maintain continuous contact between the wall and said electrical faceplate; wherein said gasket has first, second, third and fourth beveled sides; wherein said faceplate has first, second, third and fourth beveled sides; and, wherein said first, second, third and fourth beveled sides of said gasket are coextensively shaped as said first, second, third and fourth beveled sides of said faceplate, respectively; and wherein said gasket has first, second, third and fourth sides spaced externally beyond said outer perimeter of said faceplate.

2. The vapor-proof electrical faceplate of claim 1, wherein said gasket is a single duplex gasket and said faceplate is a single duplex faceplate, said single duplex gasket being adhered to a rear portion of said single duplex faceplate.

3. The vapor-proof electrical faceplate of claim 2, wherein said single duplex faceplate comprises:
a pair of single duplex openings; and,
a first aperture receiving said fastener therein.

4. The vapor-proof electrical faceplate of claim 3, wherein said single duplex gasket further comprises:
a pair of gasket outlet openings; and,
a second aperture mimicking said single duplex openings and said first aperture respectively;
wherein said single duplex gasket is fabricated from a flame retardant material.

5. The vapor-proof electrical faceplate of claim 1, wherein said gasket is formed from resilient material.

6. A vapor-proof electrical faceplate for reducing air, heat, and moisture leakage from an electrical receptacle and an electrical box, said vapor-proof electrical faceplate comprising:
a gasket adapted to cover an entire surface area of the electrical box;
a faceplate adhesively attached to an anterior face of said gasket, said faceplate having an outer perimeter spaced inwardly from an outer perimeter of said gasket; and,
a fastener removably penetrated through said gasket and said faceplate such that said fattener is adapted to be securely mated to the electrical box;
wherein said gasket remains statically mated to said faceplate during operating conditions such that said gasket outer perimeter is adapted to maintain continuous contact between the wall and said electrical faceplate;
wherein said gasket has a consistent thickness substantially equal to a thickness of said faceplate; and,
wherein said gasket has first, second, third and fourth sides spaced externally beyond said outer perimeter of said faceplate.

7. The vapor-proof electrical faceplate of claim 6, wherein said gasket is a single duplex gasket and said faceplate is a single duplex faceplate, said single duplex gasket being adhered to a rear portion of said single duplex faceplate.

8. The vapor-proof electrical faceplate of claim 7, wherein said single duplex faceplate comprises:
a pair of single duplex openings; and,
a first aperture receiving said fastener therein.

9. The vapor-proof electrical faceplate of claim 8, wherein said single duplex gasket further comprises:
a pair of gasket outlet openings; and,
a second aperture mimicking said single duplex openings and said first aperture respectively;
wherein said single duplex gasket is fabricated from a flame retardant material.

10. The vapor-proof electrical faceplate of claim 6, wherein said gasket is formed from resilient material.

11. A method of reducing air, heat, and moisture leakage from an electrical receptacle and an electrical box, said method comprising the steps of:
acquiring a vapor-proof electrical faceplate comprising a gasket, a faceplate and a fastener, said gasket having a consistent thickness substantially equal to a thickness of said faceplate;
switching off a main power that runs to the electrical receptacle;
removing existing fasteners from an existing electrical faceplate and thereby revealing the electrical receptacle;
positioning said gasket over an entire surface area of the electrical box;
adhesively attaching said faceplate to an anterior face of said gasket, said faceplate having an outer perimeter spaced inwardly from an outer perimeter of said gasket;
securely mating said fastener to the electrical box by removably penetrating said fastener through said gasket and said faceplate; and,
maintaining said gasket statically mated to said faceplate during operating conditions such that said gasket outer perimeter maintains continuous contact between the wall and said electrical faceplate and thereby seals out air, heat, and moisture from the electrical receptacle;
wherein said gasket has first, second, third and fourth beveled sides;
wherein said faceplate has first, second, third and fourth beveled sides;
wherein said first, second, third and fourth beveled sides of said gasket are coextensively shaped as said first, second, third and fourth beveled sides of said faceplate, respectively; and,
wherein said gasket has first, second, third and fourth sides spaced externally beyond said outer perimeter of said faceplate.

* * * * *